(12) United States Patent
Lin et al.

(10) Patent No.: US 7,718,911 B2
(45) Date of Patent: May 18, 2010

(54) ELECTRONIC DEVICE AND CARD SWAPPING METHOD THEREOF

(75) Inventors: Fang-Jin Lin, Taipei (TW); Wen-Kuei Lo, Taipei (TW)

(73) Assignee: Wistron NeWeb Corp., Taipei Hsien (TW)

( * ) Notice: Subject to any disclaimer, the term of this patent is extended or adjusted under 35 U.S.C. 154(b) by 584 days.

(21) Appl. No.: 11/637,512

(22) Filed: Dec. 11, 2006

(65) Prior Publication Data

US 2007/0181413 A1   Aug. 9, 2007

(30) Foreign Application Priority Data

Feb. 3, 2006   (TW) ............................. 95103765 A

(51) Int. Cl.
*H01H 13/04* (2006.01)
(52) U.S. Cl. ....................................... 200/333; 200/296
(58) Field of Classification Search ................. 200/333, 200/293, 296; 361/752, 730, 738, 814, 725; 439/630, 188, 928
See application file for complete search history.

(56) References Cited

U.S. PATENT DOCUMENTS

| 6,304,454 | B1 | 10/2001 | Akamatsu et al. |
| 6,602,096 | B1 | 8/2003 | Kronestedt et al. |
| 2002/0118826 | A1* | 8/2002 | Kiernan et al. ......... 379/433.09 |
| 2005/0136737 | A1* | 6/2005 | Laitinen ..................... 439/607 |

FOREIGN PATENT DOCUMENTS

| CN | 1295694 A | 5/2001 |
| TW | 551566 | 9/2003 |

* cited by examiner

*Primary Examiner*—Kyung Lee
(74) *Attorney, Agent, or Firm*—Quintero Law Office

(57) ABSTRACT

An electronic device comprises a housing, a circuit board, a cover and a switch. The housing comprises an opening receiving a card. The circuit board is disposed in the housing. The cover is disposed on the housing corresponding to the opening. The switch is disposed on the circuit board, wherein when the cover is moved, the cover actuates the switch to control the circuit board.

7 Claims, 9 Drawing Sheets

170

ELECTRONIC DEVICE AND CARD SWAPPING METHOD THEREOF

BACKGROUND OF THE INVENTION

1. Field of the Invention

The invention relates to an electronic device, and in particular relates to an electronic device providing SIM card switch assembly.

2. Description of the Related Art

Dual mode phones utilize two SIM cards to transmit data via different transmission standards. FIG. 1 shows a conventional dual mode phone 10 comprising a housing 11, a display 12, an interface 13, a recess 14, a first SIM card (not shown) and a second SIM card (not shown). The first SIM card is disposed below a battery (not shown) of the dual mode phone 10. The second SIM card is disposed in the recess 14. However, when the second SIM card is removed from the recess 14, the dual mode phone 10 may not shut down because the battery is not removed before drawing the second SIM card. Thus, the second SIM card and the dual mode phone 10 can be damaged.

U.S. Pat. No. 6,602,096 discloses a mechanism for removing a SIM card, which controls power of a circuit board in SIM card removal. However, data cannot be pre-stored into the SIM card or circuit board before SIM card removal. Additionally, power of circuit board in U.S. Pat. No. 6,602,096 is shut down during SIM card removal. Thus, SIM card and circuit board may still suffer damage.

BRIEF SUMMARY OF THE INVENTION

A detailed description is given in the following embodiments with reference to the accompanying drawings.

The invention provides an electronic device comprising a housing, a circuit board, a cover and a switch. The housing comprises an opening receiving a card. The circuit board is disposed in the housing. The cover is disposed on the housing corresponding to the opening. The switch is disposed on the circuit board, wherein when the cover is moved, the cover actuates the switch to control the circuit board.

With the electronic device of the invention, the cover is pushed to actuate the switch before removing the SIM card. Thus, the circuit board has sufficient time to shut down power between the circuit board and the SIM card to prevent damage. Additionally, the circuit board can pre-store data into the SIM card to prevent data loss.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
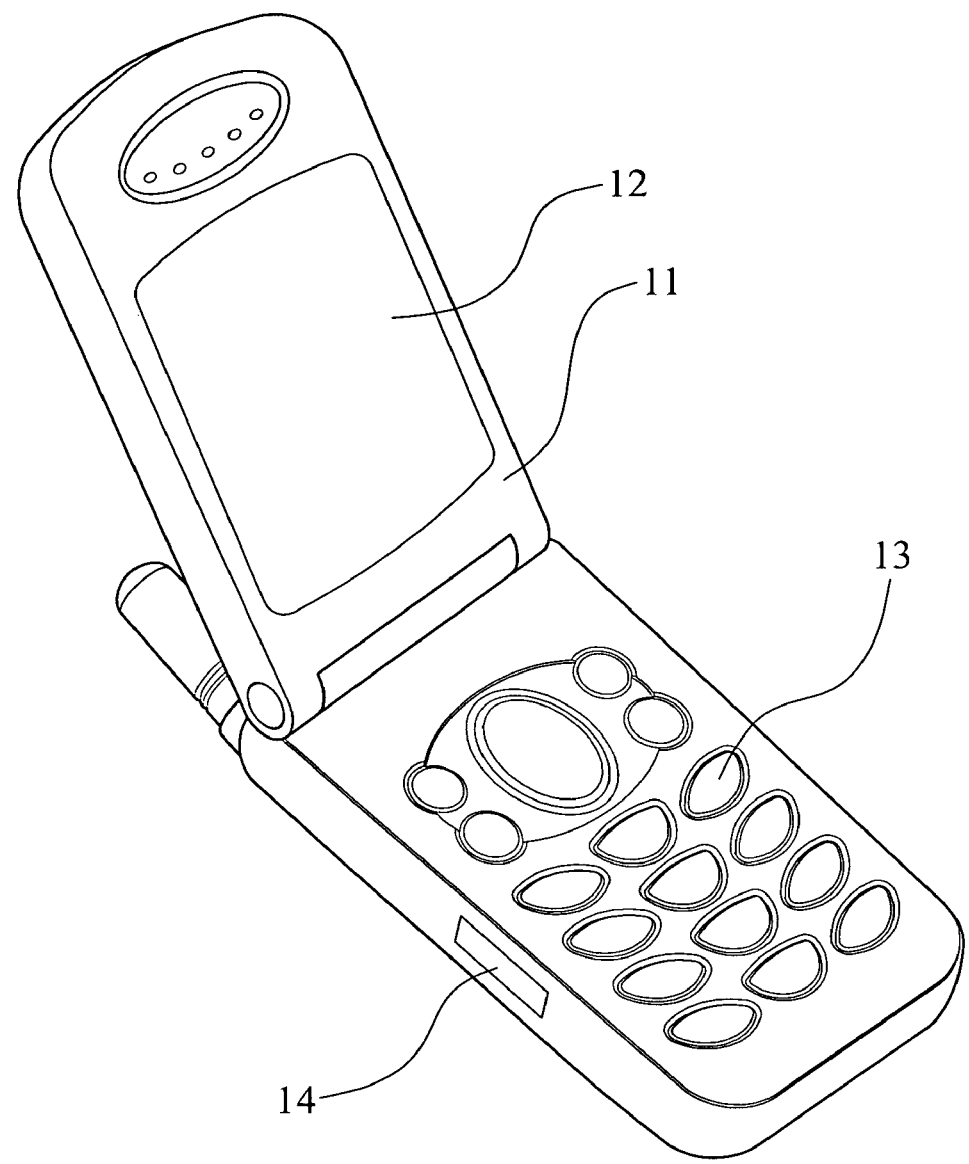
FIG. 1 shows a conventional dual mode phone.
Figure 2:
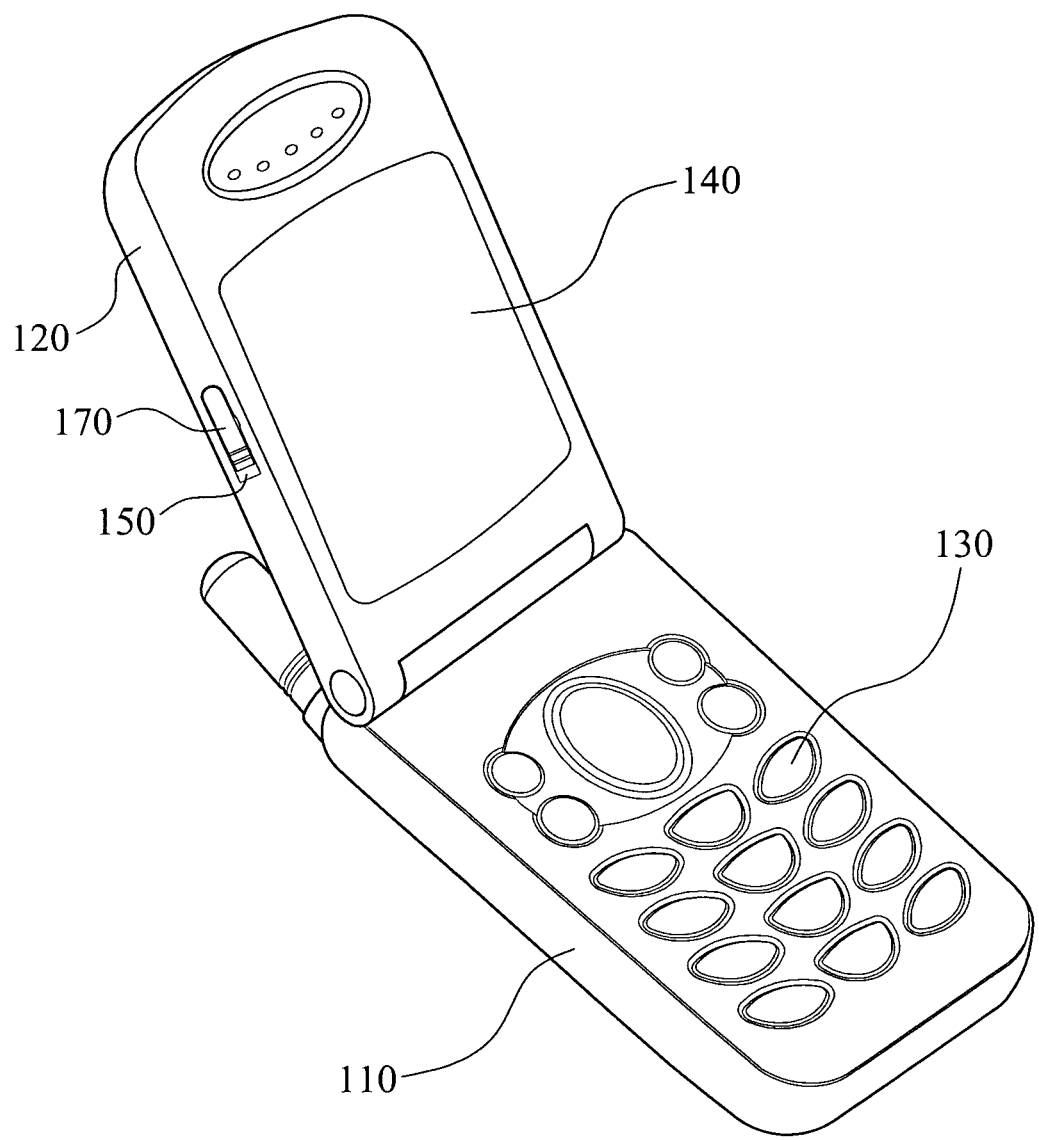
FIG. 2 shows a mobile phone of an embodiment of the invention.

FIG. 2 shows a mobile phone 100 (electronic device) of an embodiment of the invention comprising a body 110 and an upper section 120. The upper section 120 pivots on the body 110. The body 110 comprises an interface 130. The upper section 120 comprises a display 140, an opening 150 and a cover 170.

Figure 3:
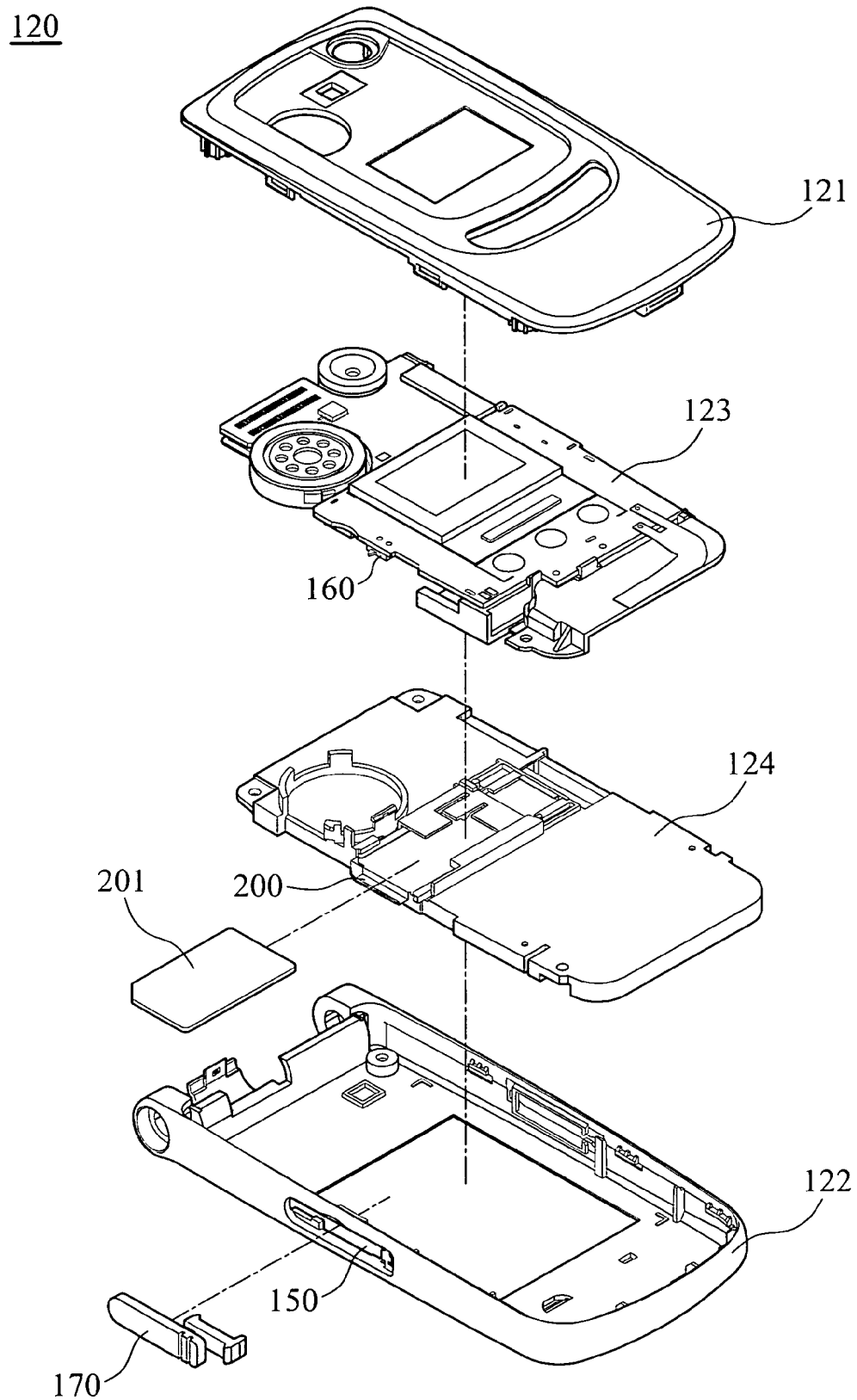
FIG. 3 shows detailed structure of an upper section.

FIG. 3 shows detailed structure of the upper section 120 comprising a first housing 121, a second housing 122, a circuit board 123, a fixing unit 124, a display 140 (with reference to FIG. 2), an opening 150, a switch 160, the cover 170, a mechanism 200 and a SIM card 201. The fixing unit 124, the circuit board 123, the mechanism 200 and the display 140 are disposed between the first housing 121 and the second housing 122. The mechanism 200 corresponds to the opening 150. The circuit board 123, the mechanism 200 and the display 140 are disposed on the fixing unit 124. The SIM card 201 is inserted into the mechanism 200. The cover 170 wedges and covers the opening 150. The switch 160 is disposed on the circuit board 123 corresponding to the cover 170.

Figure 4A:
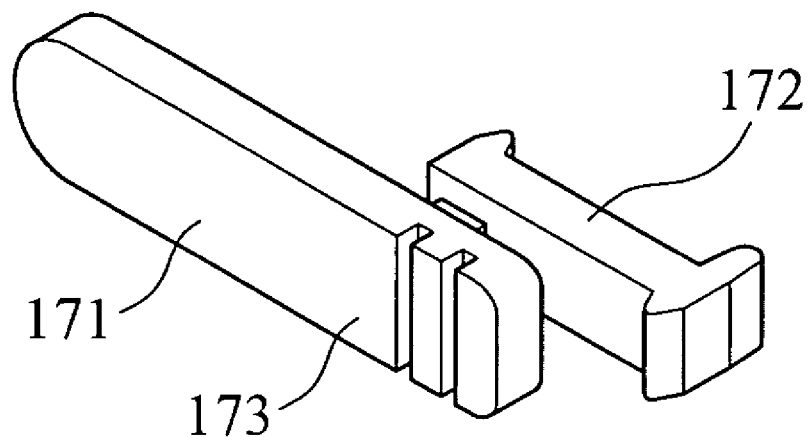
FIG. 4a shows detailed structure of a cover.
Figure 4B:
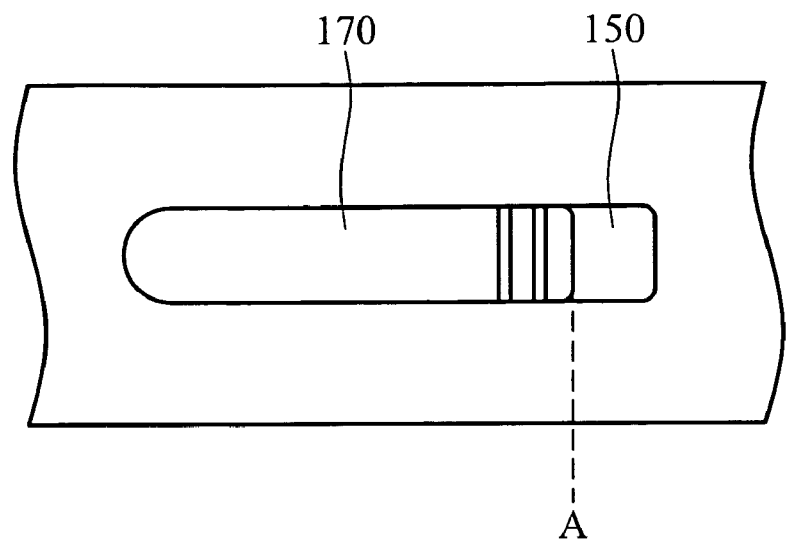
FIG. 4b shows the cover in a first position.
Figure 4C:
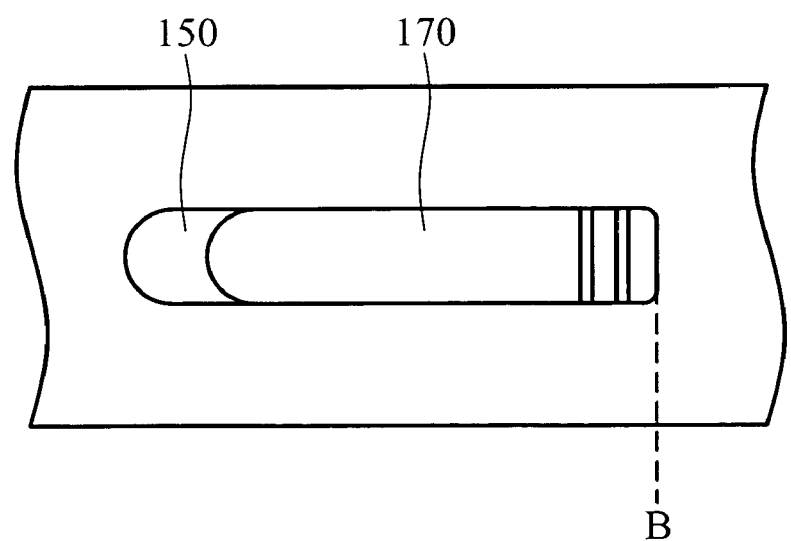
FIG. 4c shows the cover in a second position.

FIG. 4a shows detailed structure of the cover 170 comprising a shielding portion 171, a contact portion 172 and a flexible portion 173. The flexible portion 173 is disposed on an end of the shielding portion 171. The contact portion 172 is connected to the shielding portion 171. When the cover 170 is wedged into the opening 150, the shielding portion 171 is outside the second housing 122, and the contact portion 172 is inside the second housing 122. With reference to FIGS. 4b and 4c, the cover 170 is moveable between a first position A (as shown in FIG. 4b) and a second position B (as shown in FIG. 4c) in the opening 150.

Figure 5A:
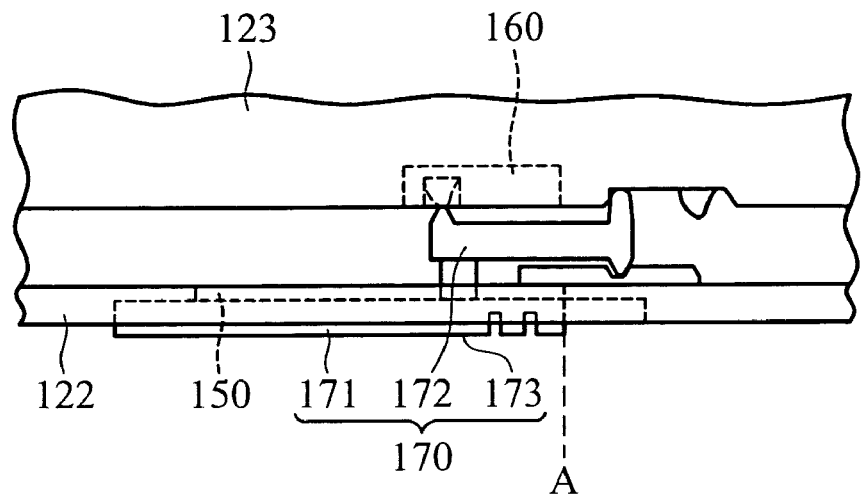
FIG. 5a shows a contact portion contacting a switch.
Figure 5B:
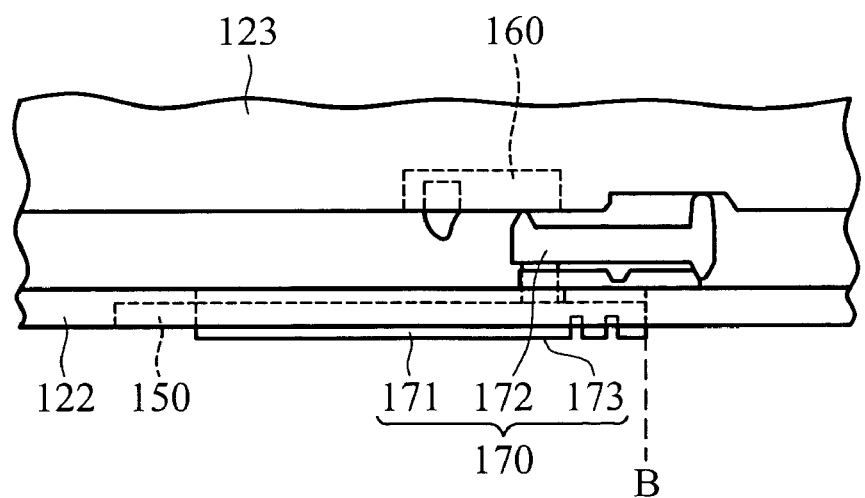
FIG. 5b shows the contact portion separating from the switch.

With reference to FIG. 5a, when the cover 170 is in the first position A, the contact portion 172 contacts the switch 160. Simultaneously, the circuit board 123 accesses the SIM card, and supplies power thereto. With reference to FIG. 5b, when the cover 170 is pushed to the second position B, the contact portion 172 separates from the switch 160. The switch 160 then directs the circuit board 123 to pre-store data to the SIM card, and shuts down power between the circuit board 132 and the SIM card.

In a modified embodiment, the switch 160 directs the circuit board 123 to pre-store data to the SIM card, and shuts down the power of the circuit board 123.

The switch can be provided by Showa Musen Kogyo Kabushikigaisha (SMK).

Figure 5C:
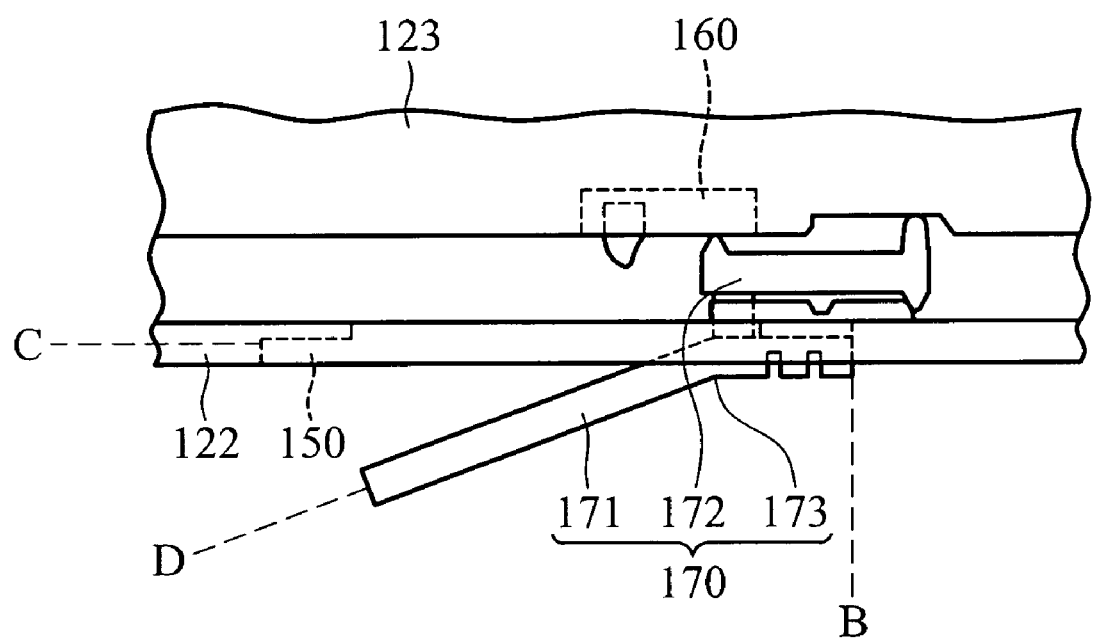
FIG. 5c shows a shielding portion in a second orientation.

With reference to FIG. 5c, when the cover 170 is in the second position B, the shielding portion 171 is rotated from a first orientation C to a second orientation D, via flexing the flexible portion 173 with elastic deformation. Thus, the opening 150 is opened and the SIM card can be removed therethrough.

Figure 6:
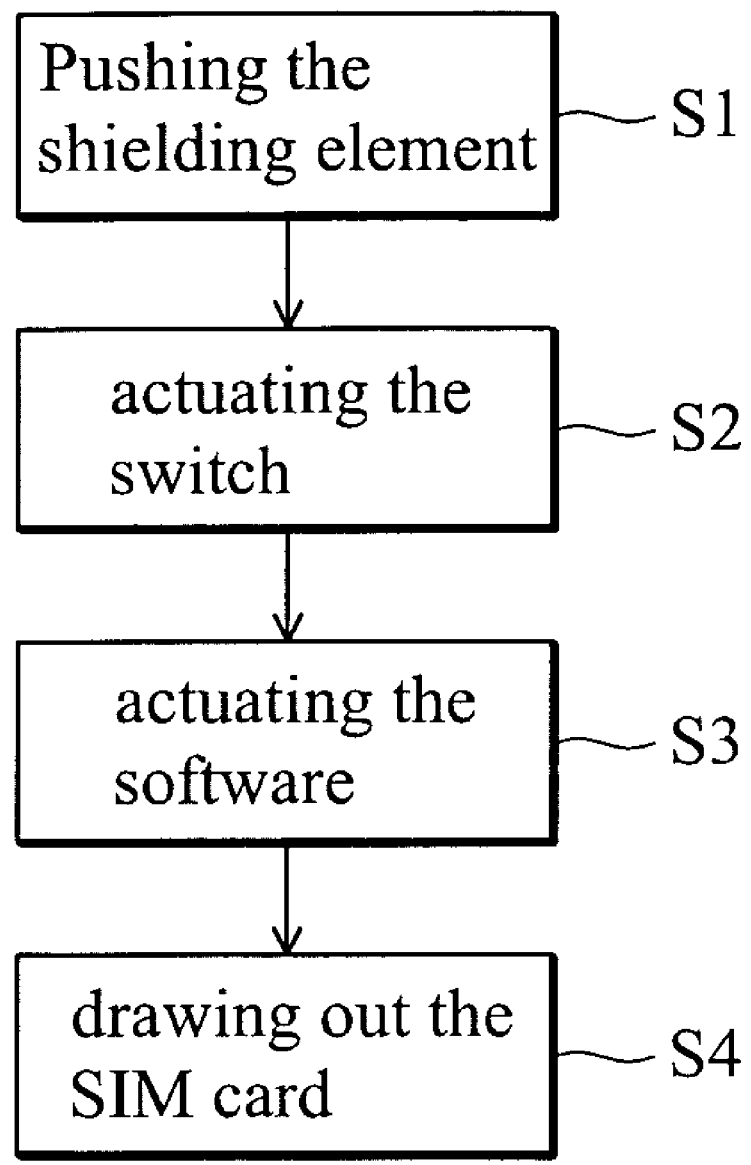
FIG. 6 is a flowchart of SIM card removal of the invention.

FIG. 6 is a flowchart of SIM card removal of the embodiment the invention. First, the cover is pushed (S1), and the switch is actuated by the cover (S2). Then, software in the circuit board is actuated by the switch (S3) to shut down power between the circuit board and the SIM card or store data. Finally, the SIM card in removed (S4).

Figure 7A:
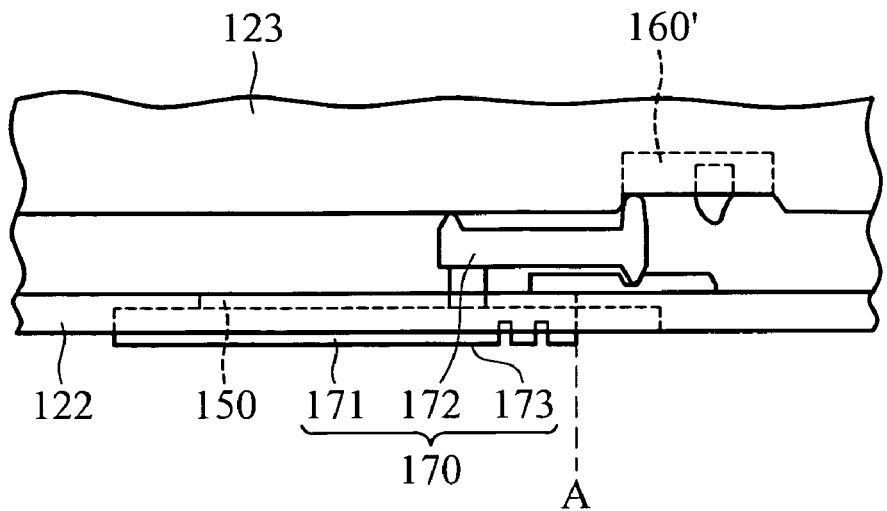
FIGS. 7a and 7b show a modified embodiment of the invention.
Figure 7B:
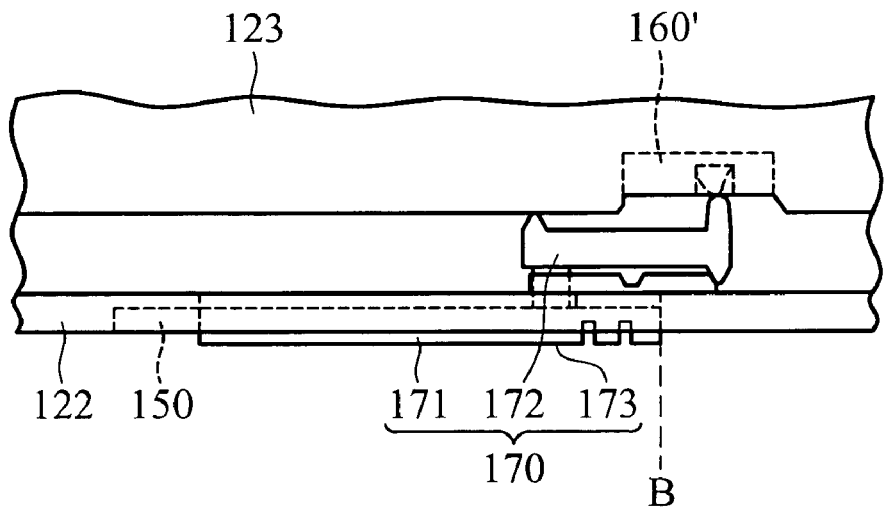

FIGS. 7a and 7b show a modified embodiment of the invention, wherein when the cover 170 is in the first position A, the cover 170 covers the opening 150 and separates from the switch 160'. When the cover 170 is in the second position B, the cover 170 actuates the switch 160' to control the circuit board 123.

With the electronic device of the embodiment of the invention, the cover is pushed to actuate the switch before removing the SIM card. Thus, the circuit board has sufficient time to shut down power between the circuit board and the SIM card to prevent damage. Additionally, the circuit board can pre-store data into the SIM card to prevent data loss.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a housing, having an opening receiving a card;
   a circuit board, disposed in the housing;
   a cover, disposed on the housing corresponding to the opening, wherein the cover comprises a shielding portion, a contact portion and a flexible portion, the contact portion extends into the housing, the shielding portion is outside the housing, the shielding portion connects to the contact portion, the flexible portion is disposed on an end of the shielding portion, and the shielding portion rotates between a first orientation and a second orientation by flexing the flexible portion to open and close the opening; and
   a switch, electrically connected to the circuit board, wherein the cover slides between a first position and a second position, the contact portion is moved with the cover and actuates the switch to control the circuit board, the cover covers the opening in the first position, and when the cover is slid from the first position to the second position, the switch triggers a software to store data in the card.

2. The electronic device as claimed in claim 1, wherein when the cover is in the first position, the cover contacts the switch.

3. The electronic device as claimed in claim 2, wherein when the cover is in the second position, the cover separates from the switch.

4. The electronic device as claimed in claim 1, wherein when the cover is in the first position, the cover separates from the switch.

5. The electronic device as claimed in claim 4, wherein when the cover is in the second position, the cover contacts the switch.

6. The electronic device as claimed in claim 1, wherein when the cover is moved from the first position to the second position, the switch directs the circuit board to interrupt power between the circuit board and the card.

7. The electronic device as claimed in claim 1, wherein when the cover is moved from the first position to the second position, the switch directs the circuit board to shut down the electronic device.

* * * * *